United States Patent
Tenzek

(10) Patent No.: US 7,674,109 B2
(45) Date of Patent: *Mar. 9, 2010

(54) GUIDANCE SYSTEM FOR PUSHER PLATE FOR USE IN PUSHER FURNACES

(75) Inventor: Anthony M. Tenzek, Hanoverton, OH (US)

(73) Assignee: Ajax Tocco Magnethermic Corporation, Euclid, OH (US)

( * ) Notice: Subject to any disclaimer, the term of this patent is extended or adjusted under 35 U.S.C. 154(b) by 945 days.

This patent is subject to a terminal disclaimer.

(21) Appl. No.: 11/418,580

(22) Filed: May 4, 2006

(65) Prior Publication Data

US 2007/0128006 A1    Jun. 7, 2007

Related U.S. Application Data

(60) Provisional application No. 60/749,016, filed on Dec. 7, 2005.

(51) Int. Cl.
 *F27D 3/00* (2006.01)
 *B65G 19/30* (2006.01)

(52) U.S. Cl. ..................... 432/239; 414/157

(58) Field of Classification Search .................. 432/239, 432/121, 126; 266/252; 414/173, 157
See application file for complete search history.

(56) References Cited

U.S. PATENT DOCUMENTS

| | | | |
|---|---|---|---|
| 1,851,913 A | | 3/1932 | Lange |
| 2,031,195 A | * | 2/1936 | Thompson ................ 238/10 E |
| 2,241,399 A | * | 5/1941 | Harris .................... 198/867.13 |
| 3,116,821 A | | 1/1964 | Davis |
| 3,566,048 A | | 2/1971 | Martin |
| 4,117,252 A | | 9/1978 | McMaster |
| 4,412,816 A | | 11/1983 | Schlumberger et al. |
| 4,540,364 A | * | 9/1985 | Ebner ......................... 432/234 |
| 5,794,411 A | * | 8/1998 | Combs et al. .................. 53/466 |
| 5,848,890 A | * | 12/1998 | McCormick ................. 432/261 |
| 5,899,317 A | * | 5/1999 | Chisaki ................. 198/550.01 |
| 6,722,284 B2 | * | 4/2004 | Gustafson et al. ............. 105/30 |
| 6,824,736 B1 | * | 11/2004 | Wan ............................ 266/252 |
| 7,507,087 B2 | * | 3/2009 | Tenzek ....................... 432/126 |
| 2007/0128569 A1 | * | 6/2007 | Tenzek et al. ............... 432/121 |

* cited by examiner

*Primary Examiner*—Charles A Fox
(74) *Attorney, Agent, or Firm*—Sand & Sebolt

(57) ABSTRACT

A pusher plate for use in a pusher furnace includes a shaped guidance groove in its lower surface which preferably has a bow-tie shape with a narrower central section and wider ends proximate the leading and trailing faces of the plate. The groove receives therein a guide rail which is disposed intermediate a pair of slide rails upon which the plate slides. The shape of the groove allows the plate a small amount of lateral rotation to minimize jamming during travel. Adjacent plates pivot upon contact with each other to automatically adjust their orientation during travel through the furnace. The leading and trailing faces of the plates thus contact one another over a larger surface area to reduce damage to the plates by reducing the pressure therebetween.

28 Claims, 8 Drawing Sheets

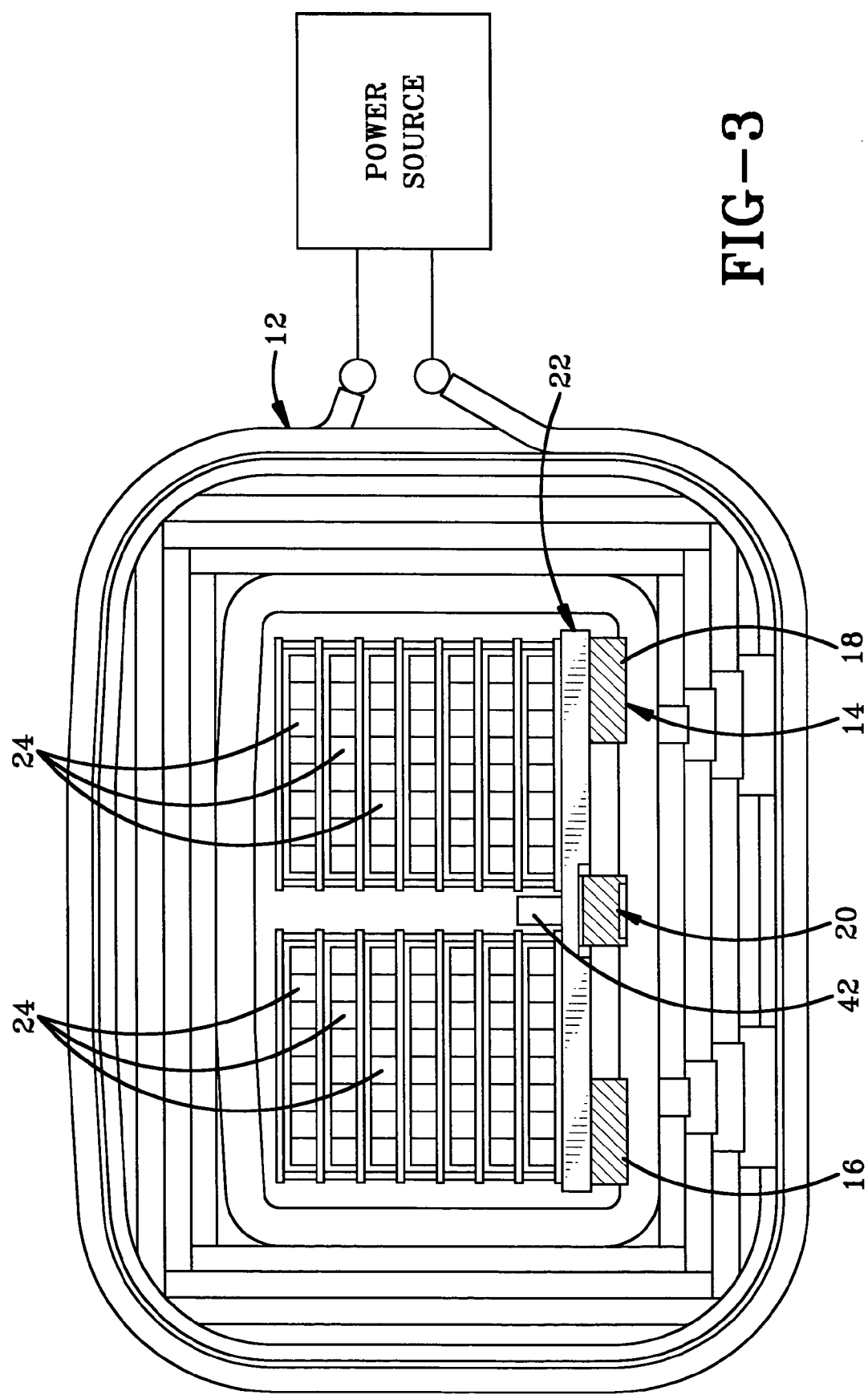

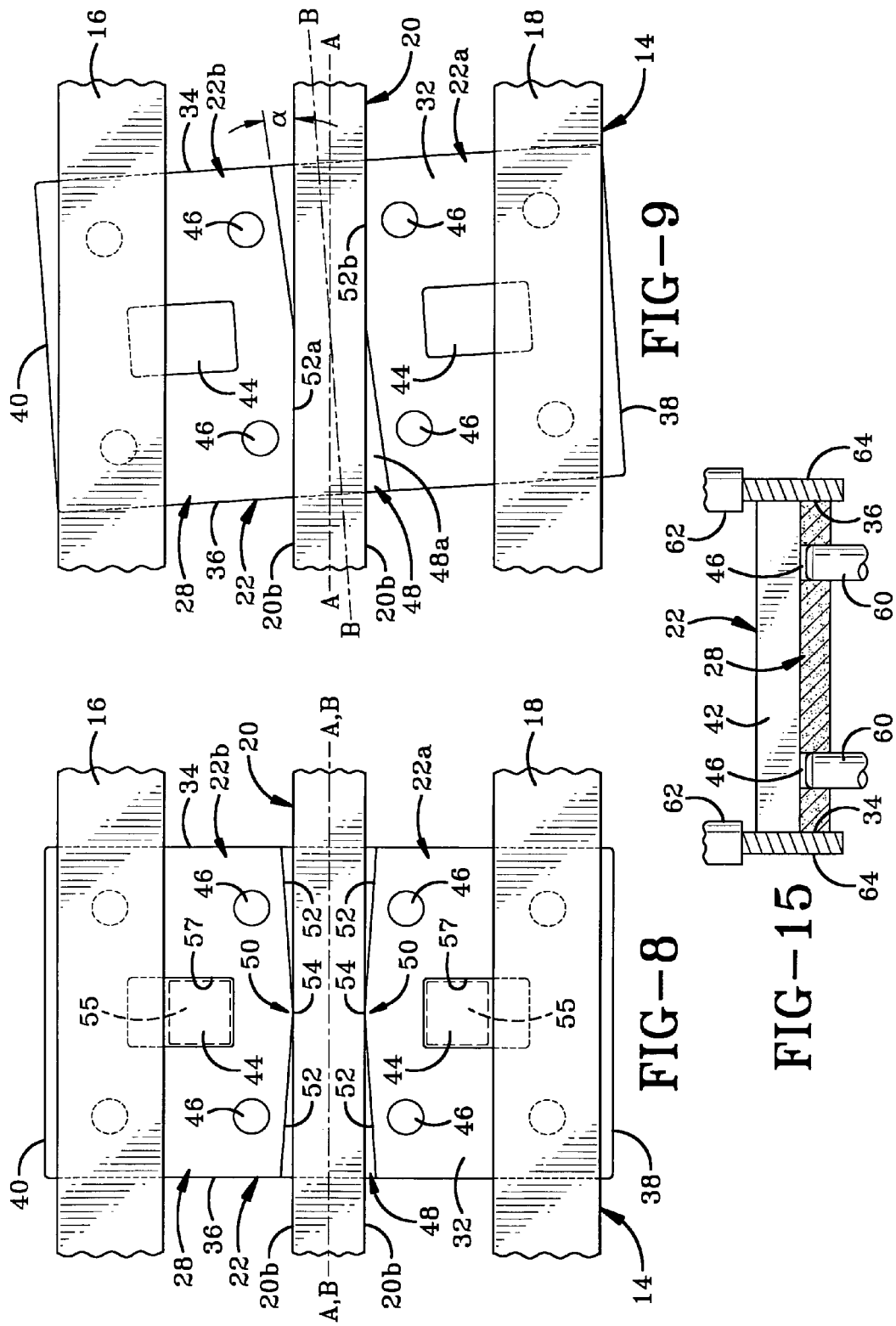

US 7,674,109 B2

GUIDANCE SYSTEM FOR PUSHER PLATE FOR USE IN PUSHER FURNACES

CROSS REFERENCE TO RELATED APPLICATIONS

This application claims priority from U.S. Provisional Application Ser. No. 60/749,016 filed Dec. 7, 2005; the disclosure of which is incorporated herein by reference.

BACKGROUND OF THE INVENTION

1. Technical Field

This invention generally relates to pusher furnaces. More particularly, the invention relates to a pusher plate for use in carrying materials through a pusher furnace. Specifically, the invention relates to a pusher plate that includes a guidance system for controlling the lateral motion of the plate relative to the axis of travel and thereby increases the tendency of the pusher plate to move smoothly through the furnace.

2. Background Information

Pusher furnaces are designed in various lengths and may contain multiple heating and cooling sections as required by the application. These furnaces also include a substantially continuous flat surface or a pair of slide rails running through the interior thereof. A plurality of pusher plates are pushed sequentially along the flat surface or slide rails and through the line of heating sections. So, for example, a first pusher plate is placed on the slide rails and is pushed into the first heating section by a pusher arm or other suitable mechanism. A second pusher plate is then positioned behind the first pusher plate and the pusher arm forces the leading face of the second plate into abutting contact with the trailing face of the first pusher plate. The pusher arm then pushes the second plate into the opening in the first heating section. This motion advances the position of the first pusher plate within the first heating section. A third pusher plate is then introduced behind the second pusher plate and the arm pushes that third plate into contact with the trailing face of the second pusher plate, thereby changing the second and first pusher plates positions within the heating section and so on.

The materials to be processed in the pusher furnace are placed onto the upper surface of the pusher plates. Typical materials processed in this manner include various materials required for electronic or ceramic components, as well as different metals that are to be annealed, sintered or de-waxed. Each of the heating sections in the furnace is set up to produce slightly different, but very specific, heating conditions. As the pusher plates move through the furnace, they pass through each of these different specific environments and are thereby progressively processed.

One of the main problems experienced in pusher furnace systems is that even small variations in the dimensions of the pusher plates can cause the leading and trailing faces of the plates to meet unevenly. This may cause the plates to twist or turn slightly on the slide rails and may result in the plates bumping into the side walls of the heating section, rising up over an adjacent plate or being pushed under an adjacent plate. Furthermore, the plates may become jammed or wedged against each other or against the heating section walls. This can result in physical damage to the plates, to the heating section walls or to the material carried on the plates. Furthermore, damage may also result to the plates themselves from mechanical stresses due to uneven contact between adjacent plate contact surfaces.

There is therefore a need in the art for an improved pusher plate for use in continuous or indexing pusher furnaces which tends to stay in line when pushed, tends not to rise up over the plates in front of it and which reduces the potential for stoppage of the line during processing.

SUMMARY OF THE INVENTION

The present invention provides a pusher plate for moving materials to be heated thereon through a pusher furnace having a guide rail which extends through at least one heating section of the furnace and defines an axis of travel of the pusher plate; the pusher plate comprising a body having a leading face, a trailing face and a lower surface; and a groove formed in the pusher plate which extends upwardly from the lower surface from the leading face to the trailing face; wherein the groove has a shape adapted to allow rotation of the pusher plate about a generally vertical axis during travel of the pusher plate along the axis of travel with the guide rail disposed in the groove.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

FIG. 3 is a side view of the first heating section and the first pusher plate through line 3-3 of FIG. 1;

FIG. 8 is a bottom view of the pusher plate engaged on the slide rails;

FIG. 9 is a bottom view of the pusher plate engaged on the slide rails, with the pusher plate twisted laterally away from the longitudinal axis of the rails;

FIG. 15 is a partial cross-sectional side view of the pusher plate engaged on guide pins thereby allowing for the pusher plate to be machined by routers or similar devices.

Similar numbers refer to similar parts throughout the drawings.

DETAILED DESCRIPTION OF THE INVENTION

Figure 1:
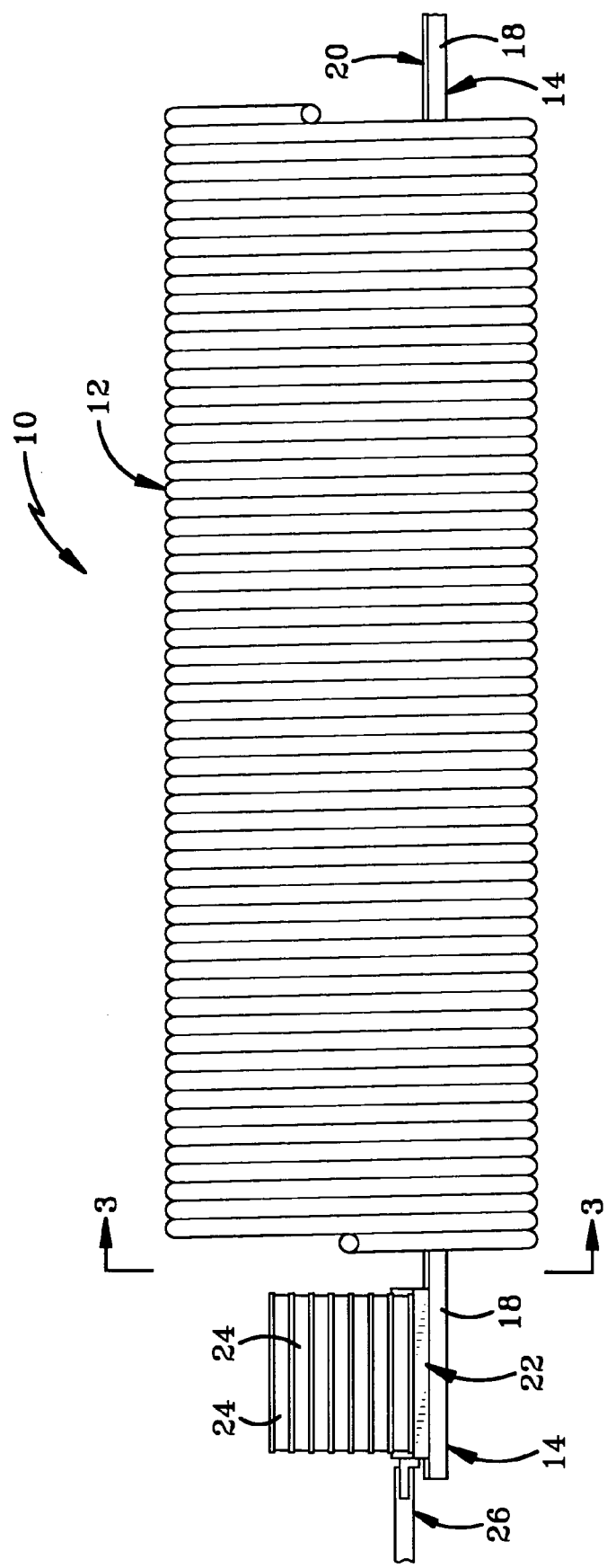
FIG. 1 is a front elevational view of a first heating section into which is being introduced, a pusher plate in accordance with the present invention, together with its associated load.
Figure 2:
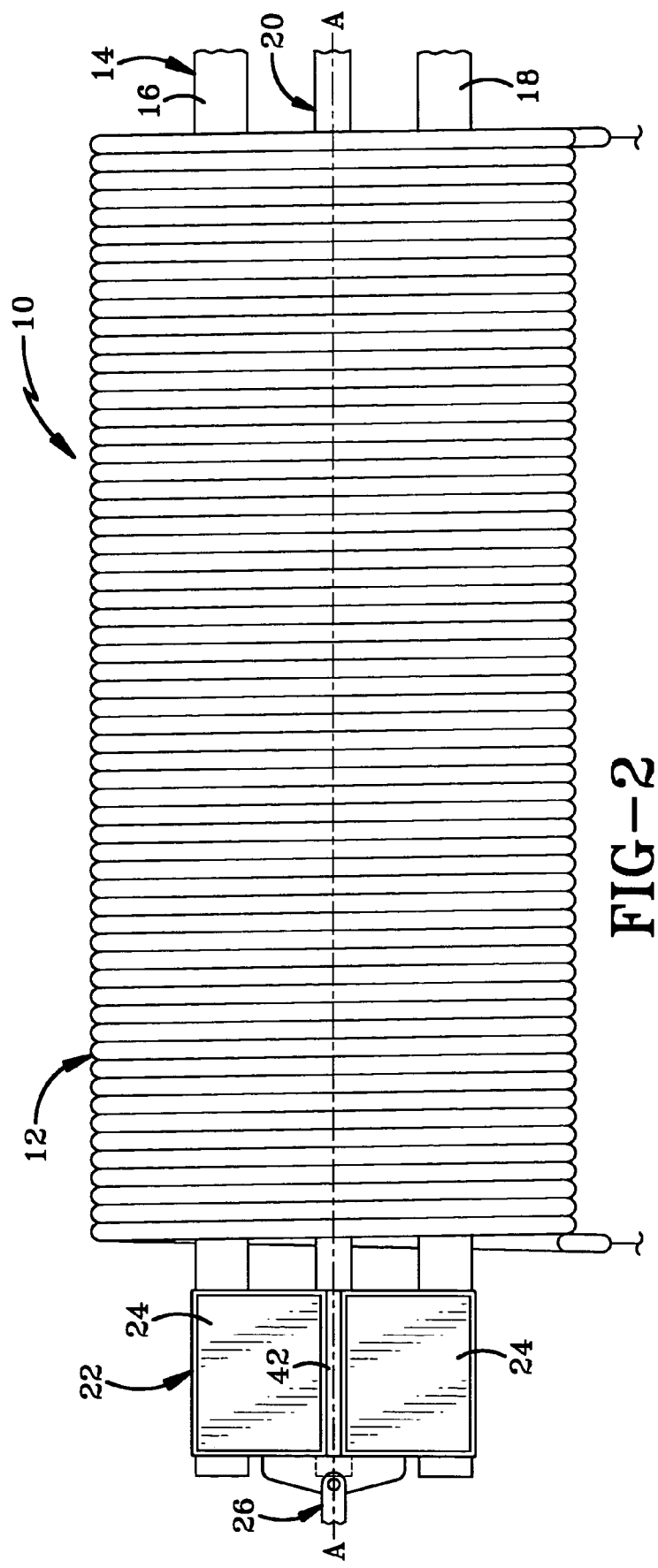
FIG. 2 is a top view of the first heating section and the pusher plate of FIG. 1.

Referring to FIGS. 1-3, there is shown a pusher furnace system, generally indicated at 10. Furnace system 10 includes at least one heating section 12 and a plate transporting system 14 which extends through the interior of heating section 12. In the illustrated furnace system 10, the heating section 12 comprises an induction coil and the transporting system 14 includes a pair of spaced apart slide rails 16, 18 with a guide rail 20 disposed centrally between them. The upper surfaces of slide rails 16, 18 are disposed a short distance inwardly of the upper surface of guide rail 20. At least one pusher plate 22 is provided for transporting materials 24 into heating section 12. A pusher arm 26 is engaged to push pusher plate 22, and therefore materials 24, into heating section 12. Pusher plate 22 is moved through furnace system 10 along a longitudinal axis of travel indicated at A-A in FIG. 2. Slide rails 16, 18 and guide rail 20 are oriented substantially parallel to the axis of travel A-A.

Pusher plate 22 in accordance with the present invention is shown in greater detail in FIGS. 4-7. Plate 22 comprises a base 28 having an upper surface 30, a lower surface 32, a leading face 34, a trailing face 36 and sides 38, 40. Leading and trailing faces 34 and 36 are preferably substantially flat or planar. Plate 22 preferably comprises first and second sections 22a, 22b which are separated from each other by a ridge 42 that extends outwardly and upwardly away from upper surface 30. The material load 24 is carried partially on either side of ridge 42. A centrally located hole 44 and a plurality of slots 46 preferably extend through each of said first and second sections 22a, 22b. Hole 44 and slots 46 are laterally offset from one another and are provided to receive components that assist in the alignment or movement of plate 22. Plate 22 is preferably made out of a softer material than are rails 16, 18 and 20. In this way, plate 22 will wear out earlier than rails 16, 18, 20. Pusher arm 26 preferably is designed to pivot to a certain degree in order to engage trailing face 36 of pusher plate 22 at an appropriate angle to move plate 22 into the furnace. Furthermore, pusher plates 22 may be periodically removed from slide rails 16, 18 and guide rail 20 and rotated through 180° so as to cause trailing face 36 to become the leading face. This periodic rotation prolongs the life of plate 22 and distributes the wear and tear on the leading and trailing faces 34, 36 more evenly, thus reducing the tendency of plate 22 to become jammed in the furnace.

Figure 6:
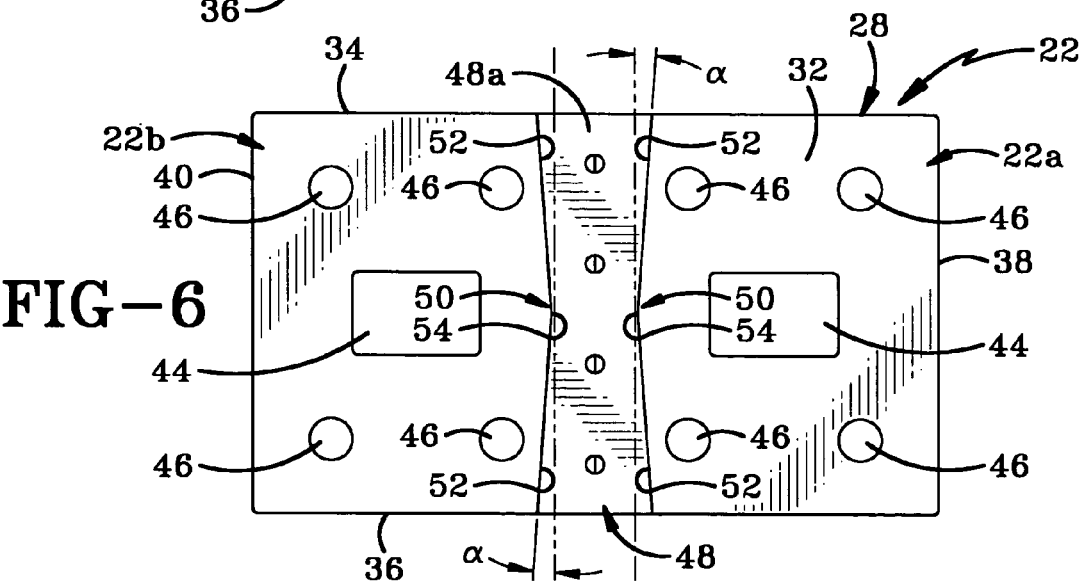
FIG. 6 is a bottom view of the pusher plate of FIG. 4 and showing the guidance groove formed in the bottom surface thereof.

In accordance with a specific feature of the present invention, a guidance groove 48 is machined into the lower surface 32 of base 28 and is substantially centered between sides 38 and 40. As may be seen from FIG. 6, groove 48 is substantially bow-tied in shape, having a wider first face disposed proximate leading face 34, a wider second face disposed proximate trailing face 36 and a narrower intermediate or central section indicated at 50. Central section 50 is preferably centered between faces 34 and 36 and is substantially only a few millimeters wider than guide rail 20. Base 28 has a longitudinal axis B-B (FIG. 4) and groove 48 is generally oriented along longitudinal axis B-B. As shown in FIG. 6, first and second sections of groove 48 each have an interior side surface 52 and central section has an interior side surface 54.

Side surfaces 52 extend from side surface 54 respectively to leading and trailing faces 34 and 36. Side surfaces 52 flare outwardly away from side surface 54 at an angle $\alpha$ ranging from 3° to 10°, and more preferably from 4° to 6°, and typically at an angle of 5° relative to the longitudinal axis B-B of base 28. The angle $\alpha$ selected is dependent on the anticipated allowable wear on faces 34 and 36. Preferably groove 48 is bilaterally symmetrical with respect to axis B-B as well as with respect to an axis which is perpendicular to axis B-B and centered between faces 34 and 36.

Figure 7:
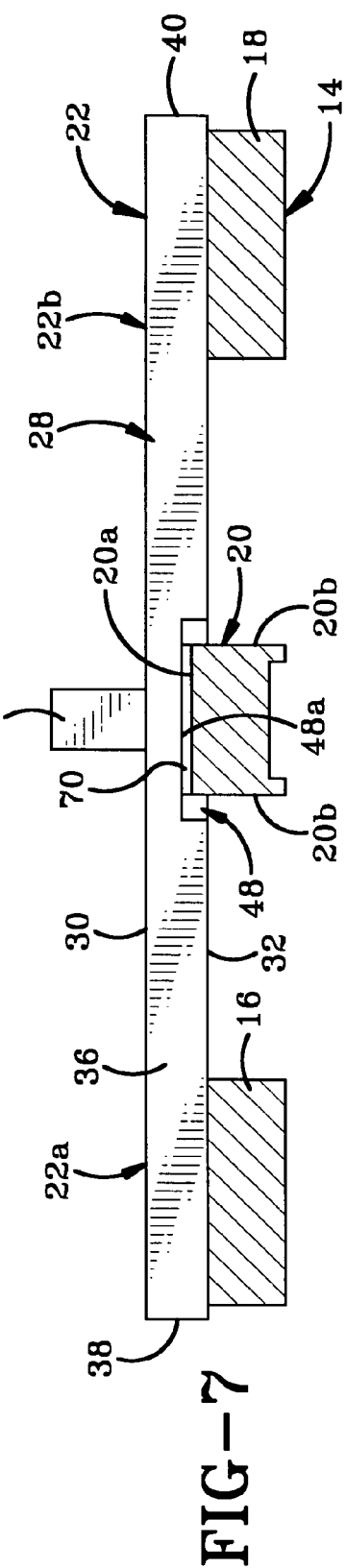
FIG. 7 is a cross-sectional side view of the pusher plate engaged with the slide rails and guide rail in the guidance groove with the details of the heating section with the material load removed therefrom.
Figure 4:
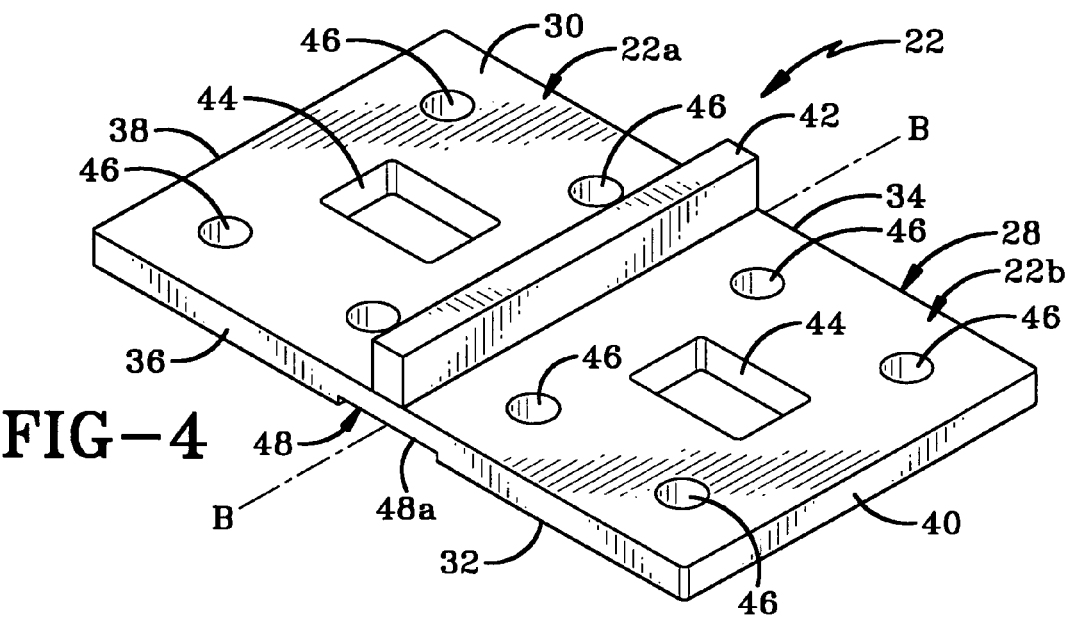
FIG. 4 is a perspective view of the pusher plate in accordance with the present invention.
Figure 5:
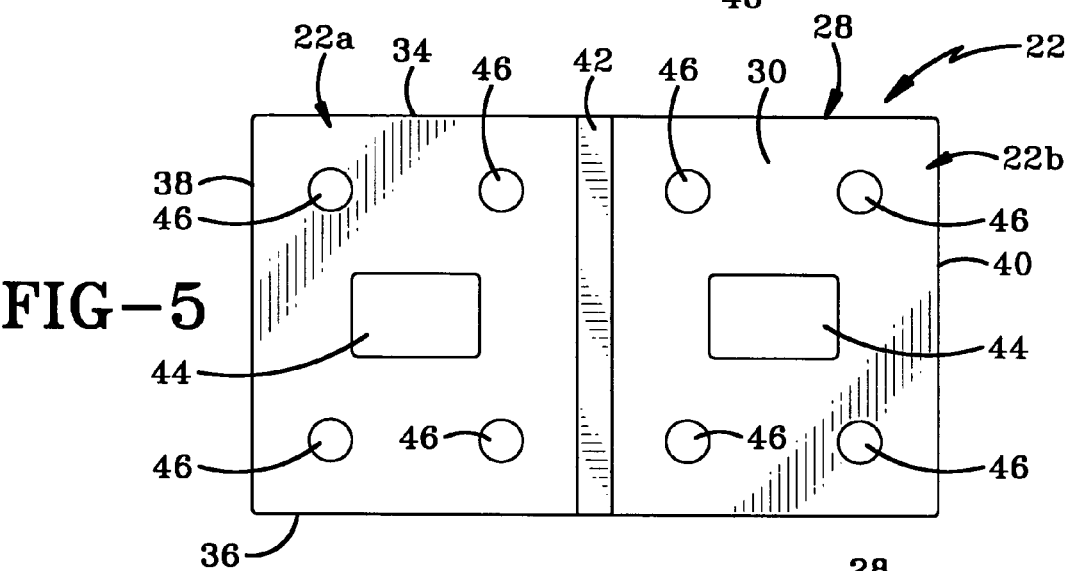
FIG. 5 is a top view of the pusher plate of FIG. 4.

During manufacture, groove 48 is machined into lower surface 32 to a depth sufficient to create a gap 70 between the interior surface 46a of groove 48 and the upper surface 20a of guide rail 20 when rail 20 is disposed in groove 48 (FIG. 7). Guide rail 20 preferably is disposed approximately 4 mm lower than the downwardly facing interior surface 48a of groove 48, i.e., the gap 70 is 4 mm deep. When plate 22 is mounted along guide rail 20, side walls or surfaces 20b of guide rail 20 are closely adjacent or abut the interior surfaces 52, 54 of groove 48 and slide-rail engaging portions of lower surface 32 of plate 22 rest respectively on slide rails 16, 18. Plate 22 is therefore able to slide down slide rails 16, 18, but its lateral motion is controlled by the interplay via groove 48 and guide rail 20. Furthermore, rails 16, 18 act as a seal that prevents deposits and dust from settling on the upper surface 20a of guide rail and on the interior surfaces 48a, 52, 54 of groove 48. One of the materials which may be processed in pusher furnace 10 is silicon. The processing of certain materials may result in silicone carbides being formed on all exposed carbon surfaces. These compounds are extremely hard and abrasive materials that will promote wear and erosion of moving surfaces which are in contact with each other. The positioning of slide rails 16, 18 on either side of guide rail 20, in combination with the fact that the upper surface 20a of rail 20 is engaged in recessed groove 48, tends to keep groove 48 and rail 20 remote from the chemical reactions in the load material 24 and prevents deposits and dust caused thereby from entering groove 48. It should be noted that plate 22 preferably is manufactured from a material that is slightly softer than guide rail 20 and the side walls of the furnace and, consequently, plate 22 will wear down faster than guide rail 20 and the side walls of the furnace. This tends to prolong the life of the guide rail 20 and reduces the need for the furnace to be shut down in order for the guide rail 20 to be replaced. Over time, the lower surface 32 of plate 22 and the slide rails 16, 18 will tend to become worn down by the continuous travel of plate 22 through the system 10, especially in the presence of abrasive materials like silicon carbides. When the operator notices that the interior upper surface 48a of groove 48 is showing wear, then it is a signal that the rails 16, 18 have worn down by approximately 4 mm and indicates that the rails 16, 18 and plate 22 should be inspected to determine if any of these components needs to be replaced.

There are also certain aspects of the bow tie shape that attribute to correct functioning of plate 22. These include the distance from the central section 50 to one of the leading and trailing faces 34, 36. This distance allows for some degree of freedom for plate 22 to be initially guided into furnace 10 as well as allowing plate 22 to accommodate differences in various components in furnace 10 due to different manufacturing tolerances and differences in thermal expansion and cooling. The flared gap with angle $\alpha$ between the side surfaces 52 of groove 48 and side surfaces 20b of guide rail 20 permits and limits the allowable twist in plate 22. Finally, the width or radius of central section 50 is essentially the pivot point for plate 22 and the radius needs to be sufficiently generous to allow plate 22 to slide along rail 20 while allowing for the lateral rotation and sufficient guidance of plate 22.

Referring to FIGS. 8-15, pusher plate 22 is guided through furnace system 10 in the following manner. Pusher arm 26 (FIG. 1) pushes plates 22 to slide atop slide rails 16, 18. Alternately, or in combination with pusher arm 26, a pusher 55 (shown diagrammatically in phantom in FIG. 8) may push against respective pusher surfaces 57 which bound hole 44. Pusher 55 is removably insertable into holes 44 from below plate 22 respectively between guide rail 20 and each of slide rails 16 and 18. Holes 44 and slots 46 are laterally offset in part to prevent interference between pusher 55 and slots 46 as plates 22 slide over pusher 55, which is spring-biased upwardly and thus rides along the lower surface of plates 22 when not inserted in hole 44.

FIG. 8 illustrates the scenario where guide rail 20 is engaged within groove 48 and the longitudinal axes B-B, A-A of both plate 22 and the direction of travel through furnace system 10, respectively, are aligned. In this position, leading face 34 of plate 22 lies substantially at right angles to axes A-A and B-B and guide rail 20 is in contact only with the interior side surfaces 54 of central section 50 of groove 48. Side walls 20b of guide rail 20 are not in abutting contact with side surfaces 52 of either of the wider ends of groove 48 proximate the leading and trailing faces 34, 36 of plate 22. When pusher plate 22 is oriented in this manner and pusher arm 26 engages trailing face 36 to push plate 22 through furnace system 10, then plate 22 will travel through system 10 with its leading face 34 disposed substantially at right angles to the longitudinal axis A-A of the direction of travel through system 10. This means that the leading face 34 will travel substantially at right angles to rails 16, 18 and 20.

FIG. 9 illustrates a scenario where plate 22 is disposed at an angle relative to the longitudinal axis A-A of travel through furnace system 10. Plate 22 has rotated laterally about a substantially vertical axis so that guide rail 20 is now in contact with opposing interior side walls 52a, 52b of groove 48. In this orientation, the longitudinal axis B-B of plate 22 is disposed at angle α to the longitudinal axis A-A of the direction of travel through furnace system 10. Even though leading face 34 of plate 22 is disposed at an angle other than 90° to the axis A-A, plate 22 can still slide freely along rails 16, 18 20 without becoming jammed.

Figure 10:
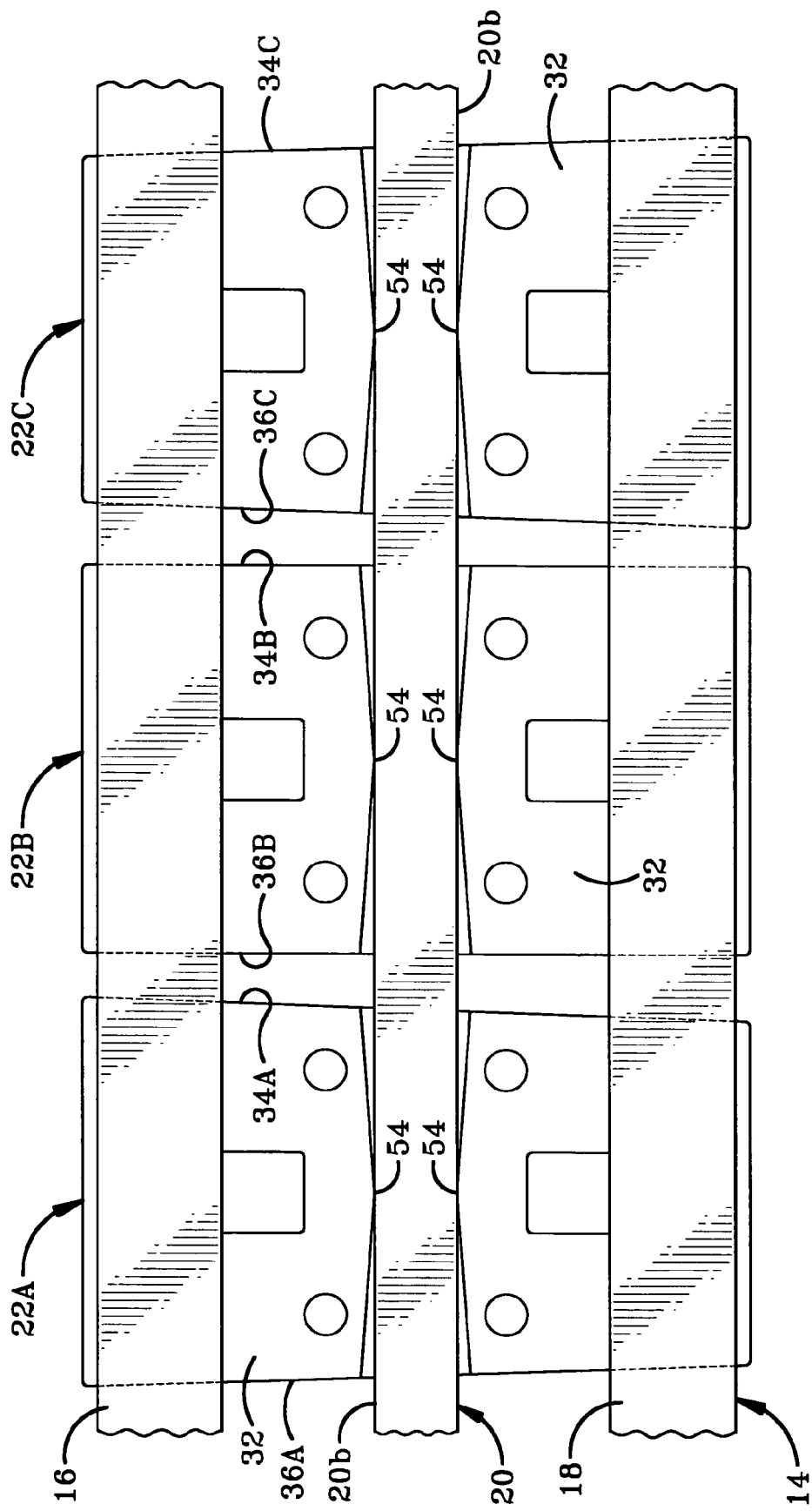
FIG. 10 is a bottom view of a plurality of pusher plates disposed adjacent each other and engaged with the guide rails; the figure illustrates in slightly exaggerated format that the pusher plates have leading and trailing faces that are not substantially parallel with each other.

FIG. 10 illustrates, in an exaggerated fashion, three pusher plates 22A, 22B and 22C engaged with guide rail 20 and resting on slide rails 16, 18, with the plates spaced apart from each other. Out of the three plates, only plate 22B is substantially rectangular in shape, having substantially parallel leading and trailing faces 34B and 36B. Plates 22A and 22C have been worn down or inadvertently manufactured to be polygonal in shape, not having substantially parallel leading and trailing faces 34A, 36A and 34C, 36C. In this instance, guide rail 20 lies in contact with the interior side surfaces 54 of all three of plates 22A, 22B and 22c.

Figure 11:
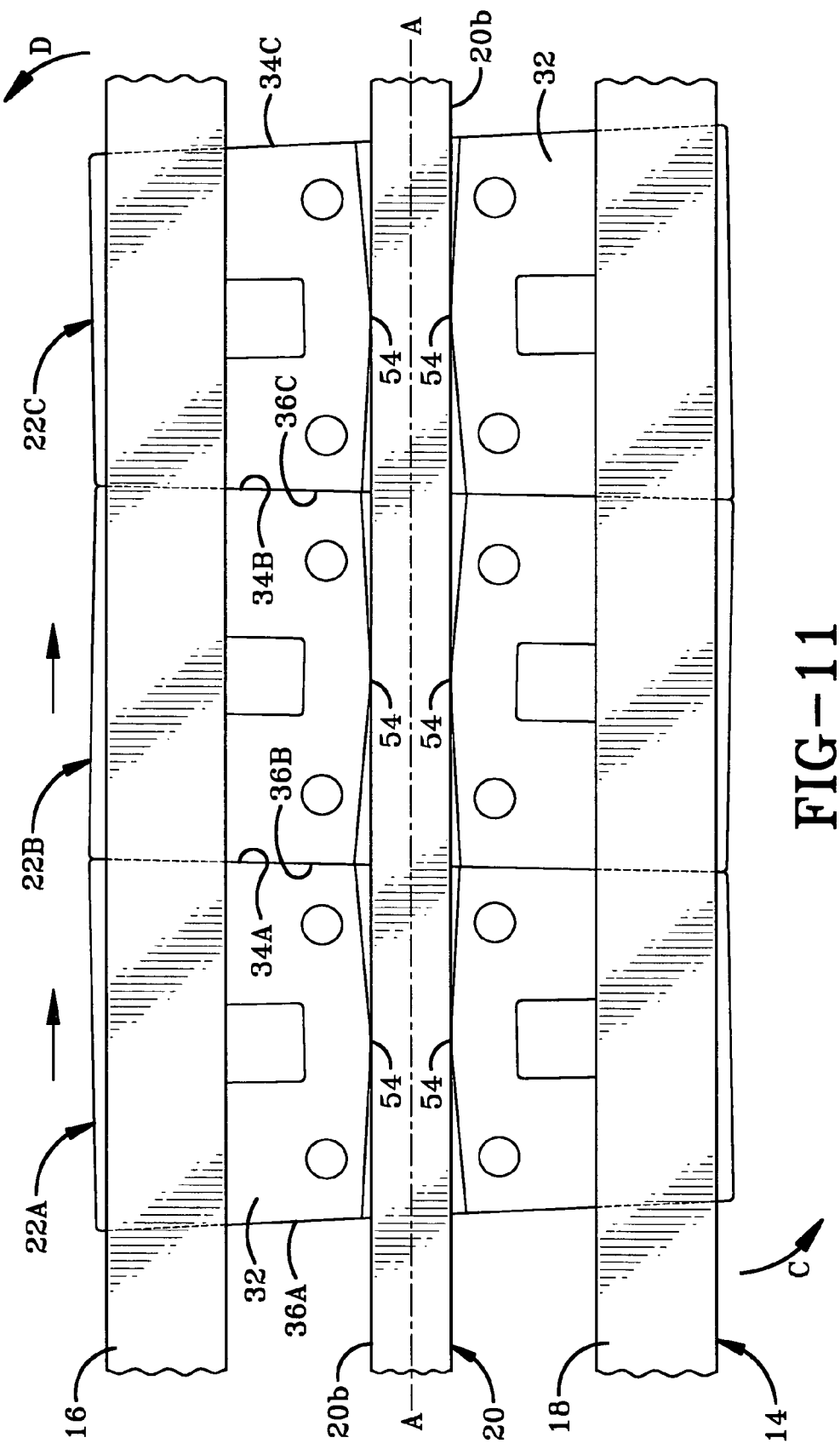
FIG. 11 is a bottom view of the pusher plates of FIG. 10, with the three plates being forced into contact with each other as occurs in pusher furnaces; and illustrating the slight lateral turning of the pusher plates relative to the longitudinal axis of the rails.

As shown in FIG. 11, when guide rail 20 is engaged in groove 48, and pusher arm 26 forces plate 22A, 22B and 22C together, then any of the three plates is able to rotate about its respective central section 50, which section 50 serves as the pivot point for that particular plate. This rotation effectively allows for the leading and trailing faces of each pusher plate to not be totally square or perpendicular to the axis of travel of the plate because of oxidation or wear on those faces or because of manufacturing tolerances. So, when plates 22A, 22B and 22C are pushed into contact with each other by pusher arm (not shown), plate 22B may remain in substantially the same orientation as in FIG. 10, but plate 22A can rotate slightly in the direction of arrow "C" bringing leading face 34A into abutting contact with trailing face 36B along substantially their entire lengths. Furthermore, plate 22C may rotate slightly in the direction of arrow "D" to bring trailing face 36C into contact with leading face 34B along substantially their entire lengths. Because plates 22A, 22B and 22C can rotate slightly, they will tend to stay in line and the forces between the pusher plate faces will tend to be evenly distributed. These slight lateral rotations of plates 22A and 22B relative to the axis of travel A-A therefore substantially allows the three plates 22A, 22B and 22C to be pushed through system 10 substantially without jamming.

Figure 12:
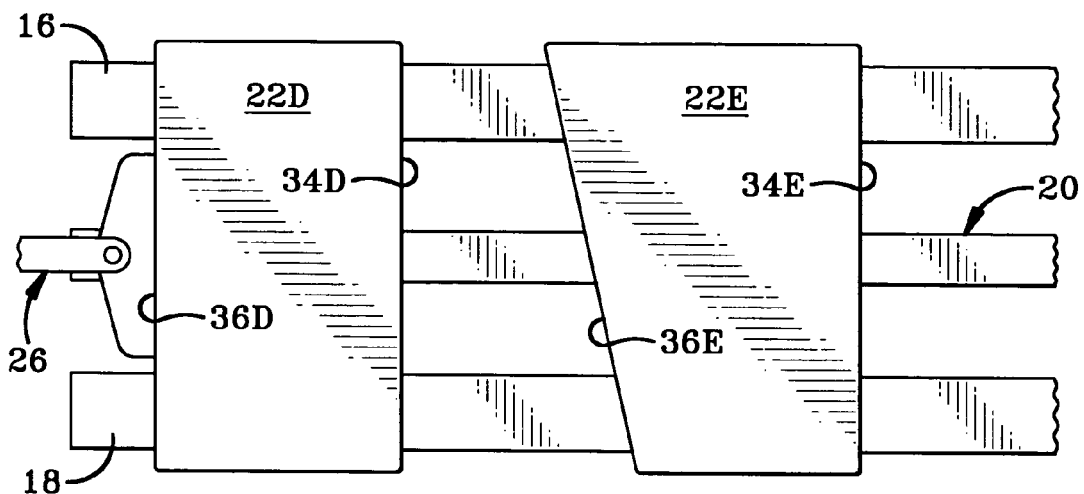
FIG. 12 is a top view of two adjacent pusher plates showing, in exaggerated form a substantially rectangular pusher plate disposed adjacent a polygonal pusher plate.
Figure 13:
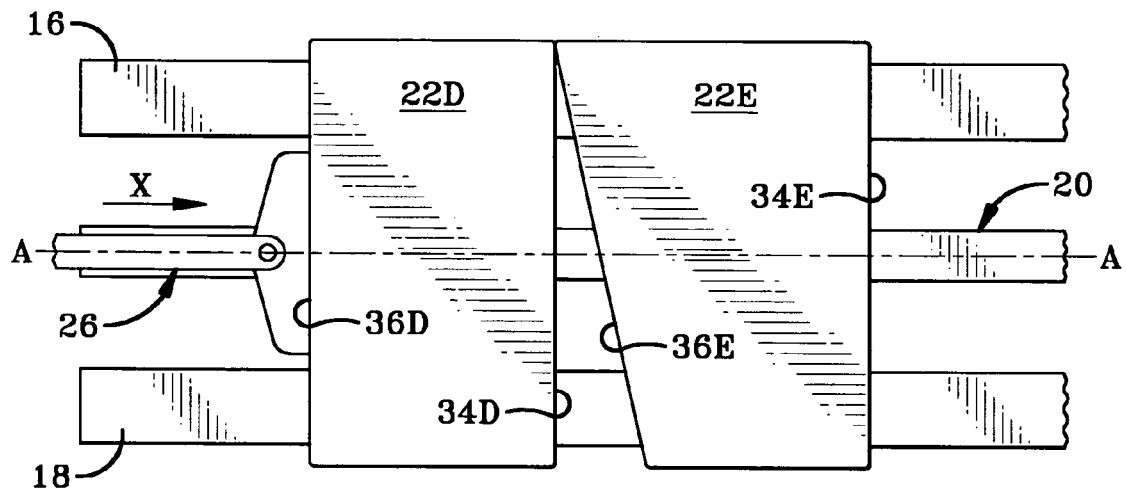
FIG. 13 is a top view of the pusher plates of FIG. 12 being brought into contact with each other with the leading face of the rearward pusher plate engaging only a tip of the trailing face of the immediately preceding pusher plate.
Figure 14:
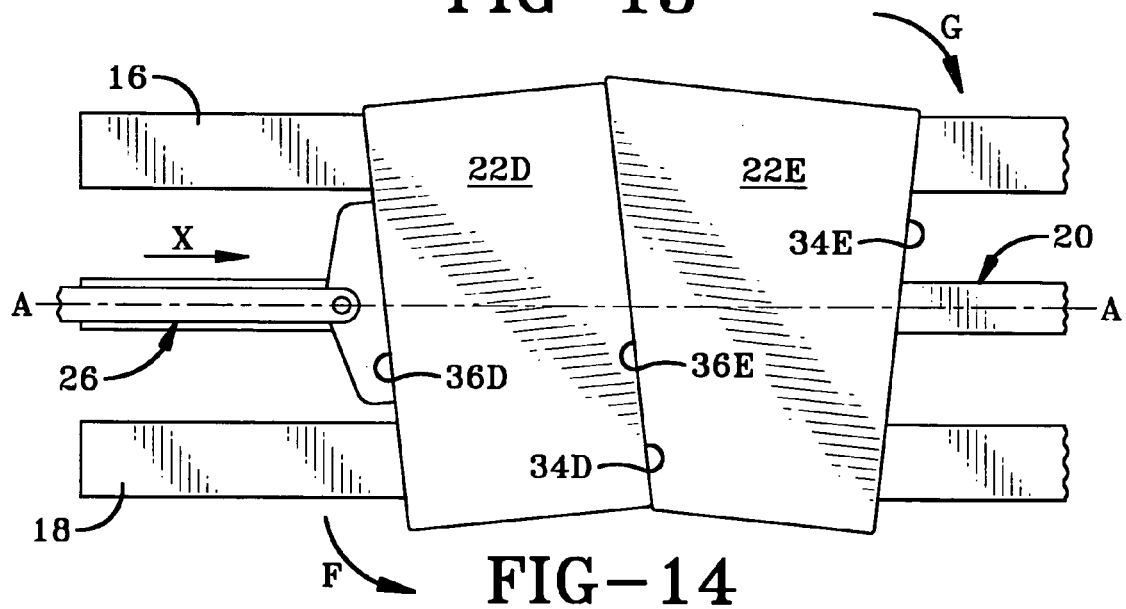
FIG. 14 is a top view of the pusher plates of FIG. 13, showing, in exaggerated form, the rotation of the rearward pusher plate to enable the leading face of that plate to directly abut the entire trailing face of the preceding plate.

FIGS. 12-14 illustrate the rotation of pusher plates in accordance with present invention, yet again in exaggerated form, but this time as viewed from the top of the pusher plates. In this instance, two plates 22D and 22E are pushed together. One of the plates 22E does not have substantially parallel leading and trailing faces 34E, 36E. As pusher arm 26 engages trailing face 36D and pushes plate 22D toward plate 22E, a small section of leading face 34D engages only the one tip of trailing face 36E of plate 22E (FIG. 13). In previously known pusher furnaces, this type of contact between two pusher plates would likely have resulted in damage to one or both of plates 22D and 22E due to the pressure at the small contact area and would likely have stopped any further movement of the plates in the direction of arrow "X". However, because the pusher plates 22D and 22E are provided with a guidance groove in accordance with the present invention (not shown in these Figures), plate 22D is able to rotate slightly in the direction of arrow "F" and plate 22E is able to rotate slightly in the direction of arrow "G". This brings leading face 34D and trailing face 36E into contact with each other along substantially their entire lengths (FIG. 14), thus reducing pressure between abutting plates 22D and 22E. Because the respective grooves 48 allow the plates to rotate laterally relative to the axis of travel A-A while moving along guide rail 20, both plates 22D and 22E can continue to be pushed through the furnace system in the direction of arrow "X" by pusher rod 26 without jamming and/or becoming damaged. The guidance grooves in plates 22D, 22E therefore allow the plates to be guided through the heating sections in the furnace system in substantially a straight line. Guidance groove 48 also limits the possible sideways travel of plate 22 thereby reducing the likelihood of contact between the plates 22 and the interior side walls of heating section 12. If groove 48 were not provided so that rail 20 could be disposed therein as a guide, then the plate could simply slide over the rails and crash into other plates and into the sides of the heating section, possibly causing damage to both the furnace system and to the material being processed.

The guidance groove also allows for some degree of freedom for pusher plates 22 to be initially introduced into the furnace system 10 and gives plates 22 the ability to laterally twist to a certain degree as they pass from one furnace section to the next. Plates 22 are therefore able to better accommodate manufacturing tolerances and differences in thermal expansion of the various components in the system.

FIG. 15 illustrates how guides in the form of pins 60 may be removably received in slots 46 so that plate 22 and its associated material load 24 can be guided between routers 62 or some other similar sort of cutting or trimming tool, so that the plate 22 can be shaped and processed as desired. More particularly, guides 60 maneuver and position plate 22 so that router bits 64 or another cutter or abrasive material can trim leading and trailing faces 34 and 36 to square them up so that they are perpendicular to longitudinal axis B of plate 22. This trimming process increases the usable life of plates 22, reducing the lateral rotation of plates 22 and consequently additional wear of plates 22. The trimming process also ensures that the respective groove 48 can accommodate any rotation necessary to allow the abutting leading and trailing faces of an abutting pair of plates 22 to engage one another substantially along their entire length to prevent damage to plates 22 as discussed previously.

The disclosed pusher plate works in cooperation with the pivotable pusher arm and periodic rotation of the pusher plates to aid in keeping the furnace in substantially continuous operation.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A pusher plate for moving materials to be heated thereon through a pusher furnace having a guide rail which extends through at least one heating section of the furnace and defines an axis of travel of the pusher plate; the pusher plate comprising:
    a body having a leading face, a trailing face and a lower surface; and
    a groove formed in the pusher plate which extends upwardly from the lower surface from the leading face to the trailing face; wherein the groove has a first section and a second section which is laterally wider than the first section so that the groove has a shape which allows limited rotation of the pusher plate about a generally vertical axis during travel of the pusher plate along the axis of travel with the guide rail disposed in the groove; and
    wherein when the guide rail is disposed in the groove, the guide rail extends continuously from the leading face to the trailing face of the body and the pusher plate is rotatable about the generally vertical axis at least 6° and no more than 20°.

2. The pusher plate of claim 1 wherein the groove has an intermediate section disposed between the leading and trailing faces; and wherein the groove adjacent each of the leading and trailing faces is laterally wider than within the intermediate section.

3. The pusher plate of claim 2 wherein the groove is bounded by opposed side surfaces; wherein the side surfaces taper laterally outwardly from adjacent the intermediate section toward the leading face; and wherein the side surfaces taper laterally outwardly from adjacent the intermediate section toward the trailing face.

4. The pusher plate of claim 3 wherein each of the side surfaces include respective front portions which extend from the intermediate section to the leading face; wherein each of the side surfaces include respective rear portions which extend from the intermediate section to the trailing face; and wherein each of the front portions and the rear portions is substantially straight.

5. The pusher plate of claim 4 wherein the intermediate section is substantially centered between the leading and trailing faces.

6. The pusher plate of claim 4 wherein the body has a longitudinal axis extending between the leading and trailing faces; wherein the longitudinal axis and each of the front portions of the side surfaces define respectively therebetween an angle ranging from 3° to 10°; and wherein the longitudinal axis and each of the rear portions of the side surfaces define respectively therebetween an angle ranging from 3° to 10°.

7. The pusher plate of claim 6 wherein each of the angles ranges from 4° to 6°.

8. The pusher plate of claim 6 wherein the groove is bilaterally symmetrical with respect to the longitudinal axis.

9. The pusher plate of claim 3 wherein the body has a longitudinal center midway between the leading and trailing faces; each of the side surfaces include respective front portions which taper laterally outwardly from adjacent the longitudinal center to the leading face; and each of the side surfaces include respective rear portions which taper laterally outwardly from adjacent the longitudinal center to the trailing face.

10. The pusher plate of claim 9 wherein each of the front portions is substantially straight from adjacent the longitudinal center to the leading face; and each of the rear portions is substantially straight from adjacent the longitudinal center to the trailing face.

11. The pusher plate of claim 3 wherein each of the side surfaces include respective substantially straight front portions which taper laterally outwardly from the intermediate section to the leading face; each of the side surfaces include respective substantially straight rear portions which taper laterally outwardly from the intermediate section to the trailing face; and the substantially straight front portions intersect the substantially straight rear portions respectively.

12. The pusher plate of claim 1 wherein the groove is bounded by opposed side surfaces each of which is tapered.

13. The pusher plate of claim 12 wherein the body has a longitudinal axis extending between the leading and trailing faces; wherein each tapered side surface is substantially straight; and wherein the longitudinal axis and each of the tapered side surfaces define respectively therebetween an angle ranging from 3° to 10°.

14. The pusher plate of claim 1 wherein the groove is bounded by opposed side surfaces; and wherein the groove narrows laterally between the opposed side surfaces rearwardly from the leading face.

15. The pusher plate of claim 14 wherein the groove narrows laterally between the opposed side surfaces forwardly from the trailing face.

16. The pusher plate of claim 1 wherein the body has opposed sides each extending from the leading face to the trailing face; and wherein the groove is substantially centered between the opposed sides.

17. The pusher plate of claim 1 wherein each of the leading and trailing faces is substantially planar.

18. The pusher plate of claim 1 wherein the body has a downwardly facing surface which bounds the groove; wherein the lower surface of the body includes downwardly facing slide-rail engaging surfaces which are disposed lower than the downwardly facing surface.

19. The pusher plate of claim 18 further comprising a pair of slide rails disposed respectively on opposite sides of the guide rail; and wherein the downwardly facing slide-rail engaging surfaces are respectively slidably seated on the slide rails.

20. The pusher plate of claim 1 in combination with the guide rail; wherein the guide rail has an upper surface; and wherein the groove is bounded by a downwardly facing surface which is disposed directly above and spaced upwardly from the guide rail upper surface when the guide rail is disposed in the groove so that no portion of the pusher plate is seated on the upper surface of the guide rail.

21. The combination of claim 20 further including a pair of slide rails disposed respectively on opposite sides of the guide rail; and wherein the body of the pusher plate is slidably seated on the slide rails.

22. The pusher plate of claim 1 in combination with at least one pusher for pushing the pusher plate; and wherein the pusher includes a pivotable pusher head which pivots laterally about a generally vertical axis.

23. The pusher plate of claim 1 wherein the body defines at least one pusher-receiving opening bounded by a pushing surface adapted to be engaged by a pusher for pushing the pusher plate.

24. The pusher plate of claim 1 wherein when the guide rail is disposed in the groove, the pusher plate is rotatable about the generally vertical axis at least 8°.

25. The pusher plate of claim 24 wherein when the guide rail is disposed in the groove, the pusher plate is rotatable about the generally vertical axis at least 10°.

26. The pusher plate of claim 25 wherein when the guide rail is disposed in the groove, the pusher plate is rotatable about the generally vertical axis at least 12°.

27. The pusher plate of claim 1 wherein when the guide rail is disposed in the groove, the pusher plate is rotatable about the generally vertical axis no more than 12°.

28. The pusher plate of claim 27 wherein when the guide rail is disposed in the groove, the pusher plate is rotatable about the generally vertical axis at least 8°.

* * * * *